US012575992B2

(12) United States Patent
Wilson

(10) Patent No.: US 12,575,992 B2
(45) Date of Patent: Mar. 17, 2026

(54) CHILDBIRTH SUPPORT APPARATUS

(71) Applicant: Natalie Wilson, Buttaba (AU)

(72) Inventor: Natalie Wilson, Buttaba (AU)

( * ) Notice: Subject to any disclaimer, the term of this patent is extended or adjusted under 35 U.S.C. 154(b) by 73 days.

(21) Appl. No.: 18/701,488

(22) PCT Filed: Oct. 18, 2022

(86) PCT No.: PCT/AU2022/051249
§ 371 (c)(1),
(2) Date: Apr. 15, 2024

(87) PCT Pub. No.: WO2023/064980
PCT Pub. Date: Apr. 27, 2023

(65) Prior Publication Data

US 2024/0398649 A1 Dec. 5, 2024

(30) Foreign Application Priority Data

Oct. 19, 2021 (AU) ................................ 2021903352

(51) Int. Cl.
*A61G 15/00* (2006.01)
*A61G 13/12* (2006.01)

(52) U.S. Cl.
CPC ......... *A61G 15/005* (2013.01); *A61G 13/122* (2013.01); *A61G 13/1245* (2013.01); *A61G 2200/12* (2013.01); *A61G 2200/325* (2013.01)

(58) Field of Classification Search
CPC .............. A61G 13/122; A61G 13/1245; A61G 2200/12; A61G 2200/325; A61G 2200/34; A61G 2200/50; A61G 7/1044; A61G 7/1051; A61G 7/1086; A61G 7/1015; A61G 15/12; A61G 7/1001; A61G 15/005; A61G 7/1061; A61G 7/109; A61G 7/1096;
(Continued)

(56) References Cited

U.S. PATENT DOCUMENTS

2019/0133860 A1* 5/2019 Kirkham ............. A61G 7/1051

FOREIGN PATENT DOCUMENTS

EP 0832633 A1 4/1998
EP 3453374 A1 3/2019
(Continued)

OTHER PUBLICATIONS

International Preliminary Report on Patentability (Ch. II) dated Sep. 5, 2023 from PCT Application No. PCT/AU2022/051249 (5 pp.).
(Continued)

*Primary Examiner* — Ophelia A Hawthorne
(74) *Attorney, Agent, or Firm* — INNOVATION CAPITAL LAW GROUP, LLP; Vic Lin

(57) ABSTRACT

Childbirth support apparatus comprises a frame suspending a chest swing harness and a pair of thigh swing harnesses. The frame suspends the thigh swing harnesses adjacently and the chest swing harness in front of the thigh swing harnesses and the thigh swing harnesses lower than the chest swing harness so that the apparatus is configured to support a mother in a leaning-forward squatting position wherein the thigh swing harnesses hold the mother under thighs and wherein the chest swing harness holds the mother across the chest. The harnesses are not restrictively interconnected to each other so that each harness can swing independently with respect to the frame.

20 Claims, 3 Drawing Sheets

(58) Field of Classification Search
CPC .... A61G 13/00; A61G 15/00; A62B 35/0012; A62B 35/0025; A62B 35/0018
See application file for complete search history.

(56) References Cited

FOREIGN PATENT DOCUMENTS

| | | | |
|---|---|---|---|
| FR | 2818120 | A1 | 6/2002 |
| WO | 2012135911 | A1 | 10/2012 |

OTHER PUBLICATIONS

International Search Report & Written Opinion dated Feb. 6, 2023 from PCT Application No. PCT/AU2022/051249 (9 pp.).
International-type Search Report dated Aug. 18, 2022 from Australia Application No. 2021903352 (3 pp.).

* cited by examiner

CHILDBIRTH SUPPORT APPARATUS

FIELD OF THE INVENTION

This invention relates generally to birthing position support apparatus.

BACKGROUND OF THE INVENTION

During seated labour, the coccyx curls forward and reduces uteral space by up to 30%. Muscle weakness from an epidural block may further hinder progression of a baby through the birth canal.

As such, birthing harnesses are sometimes used to move a mother in to an upright position so that the coccyx is in general alignment with her spine and does not obstruct the birth canal. The harness may also support the mother in this position despite epidural muscle weakness.

For example, WO 2012/135911 A1 (Campbell) 11 Oct. 2012 discloses a harness for supporting a mother by the knees in a kneeling position. The harness is suspended and comprises an upper section configured to hold an upper part of the mother's torso and a lower section engageable with the mother's legs to limit the spacing between her knees.

EP 3453374 A1 (Kirkham) 13 March discloses a similar arrangement having a harness comprising thigh straps configured to fit around the thighs, a rear torso strap coupled to the thigh straps and an upper body strap coupled to the at least one rear torso strap and configured to fit around an upper portion of the female.

The present invention seeks to provide childbirth support apparatus, which will overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF THE DISCLOSURE

There is provided herein childbirth support apparatus comprising a frame suspending a chest swing harness and a pair of thigh swing harnesses.

The frame suspends the thigh swing harnesses adjacently and the chest swing harness in front of the thigh swing harnesses and the thigh swing harnesses lower than the chest swing harness so that the apparatus is configured to support a mother in a leaning-forward squatting position wherein the thigh swing harnesses hold the mother under the thighs and the chest swing harness holds the mother across the chest.

This squatting position moves the coccyx into general alignment with the spine, thereby opening the birth canal by approximately 30%. Furthermore, leaning forward with legs splayed apart further opens the pelvis for delivery.

Unlike the full body restrictive harnesses of the aforedescribed integrally formed or restrictively interconnected harness arrangements, the present swing harnesses are not restrictively interconnected to each other so that each harness can swing independently with respect to each other and the frame.

As such, the mother has freedom of movement as compared to prior art arrangements and can instinctively find the best body position that is most comfortable and effective for facilitating delivery.

Each thigh swing harness may comprise a web suspended between respective tethers from the frame. Each web may be openable by disconnecting one side from a respective tether.

As such, a mother can easily step into the present apparatus and attach the thigh swing harness webs behind each thigh and sit down into an ergonomic seating position. The present apparatus ergonomically supports the mother under the thighs unlike the aforedescribed arrangement of Campbell which supports the mother by the knees, an arrangement which is not only cumbersome, but which may be problematic for those suffering from knee injuries or obesity.

The chest swing harness may comprise a cross support hung from the frame by a pair of tethers either side thereof. The cross support may be a rigid bar. A pillow, cushioning or the like may be placed across the bar in use.

According to this embodiment, the present apparatus is simple, dependable and easy to climb in and out of (including without assistance) and does not require complicated strapping, buckles and the like of the aforedescribed arrangements.

The positioning of the chest swing harness cross support in front of the thigh swing harnesses allows the mother to lean forward and be supported by the chest swing harness, thereby further opening the pelvis.

The independent movement of the chest swing harnesses and thigh swing harnesses wherein each harness can swing independently from the frame allows the mother to move side to side, move the thighs with respect to each other and adjust the forward position of the torso defined the most comfortable position and optimal position for facilitating delivery without restriction.

The frame may be modularly disassembled from poles which interconnect at corners thereof so that the frame can be removably assembled within a birthing suite, or the like.

The frame may be frusto-pyramoidal to maximise height and spacing within a conventionally sized room.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Childbirth support apparatus 100 comprises a frame 101 suspending a chest swing harness 102 and a pair of thigh swing harnesses 103.

Figure 2:
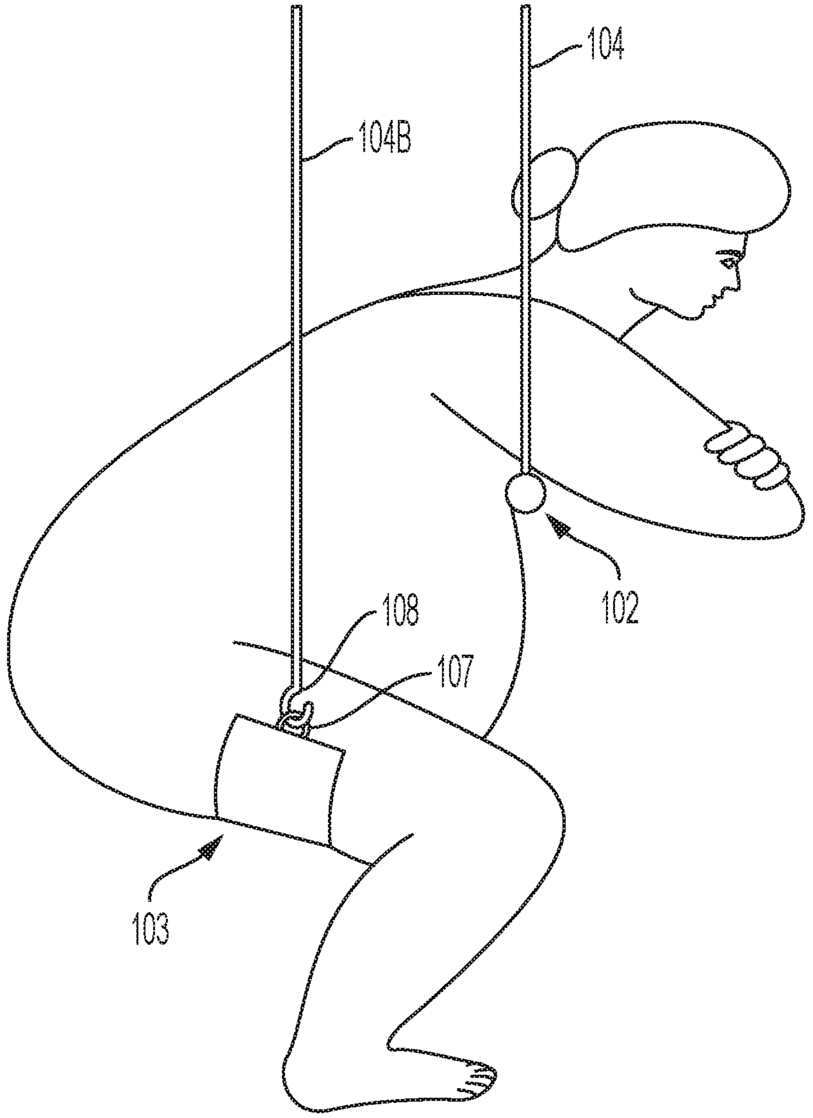
FIG. 2 is a side view showing how the apparatus can hold a mother in a leaning-forward squatting position using the apparatus.
Figure 3:
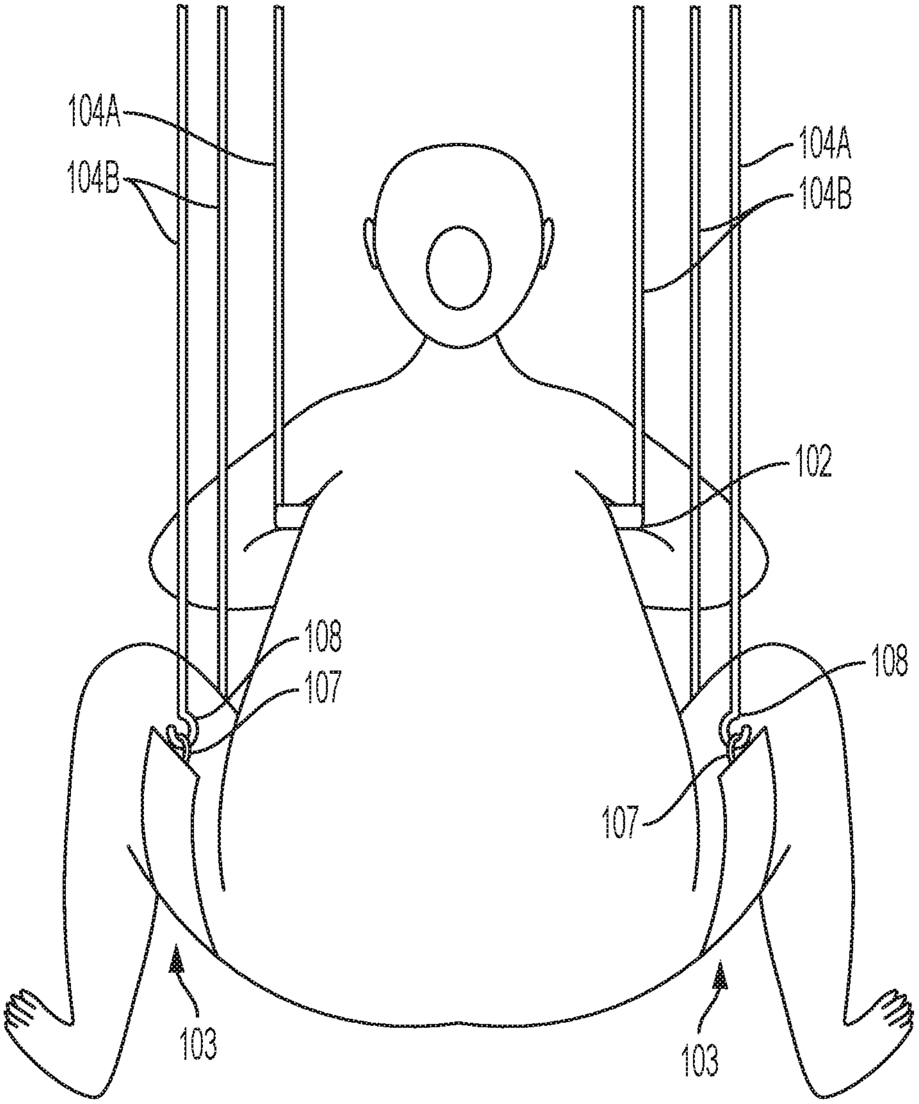
FIG. 3 is a rear view showing how the apparatus can hold the mother in the leaning-forward squatting position using the apparatus.

As is shown in FIGS. 2 and 3, the frame 101 suspends the thigh swing harnesses 103 adjacently and the chest swing harness 102 in front of the thigh swing harnesses 103. Furthermore, the frame 101 suspends the thigh swing harnesses 103 lower than the chest swing harness 102.

As such, the apparatus 100 is configured to support a mother in a leaning-forward squatting position as is evident in FIG. 2 wherein the thigh swing harnesses 103 hold the mother under the thighs and the chest swing harness 102 holds the mother across the chest.

Figure 1:
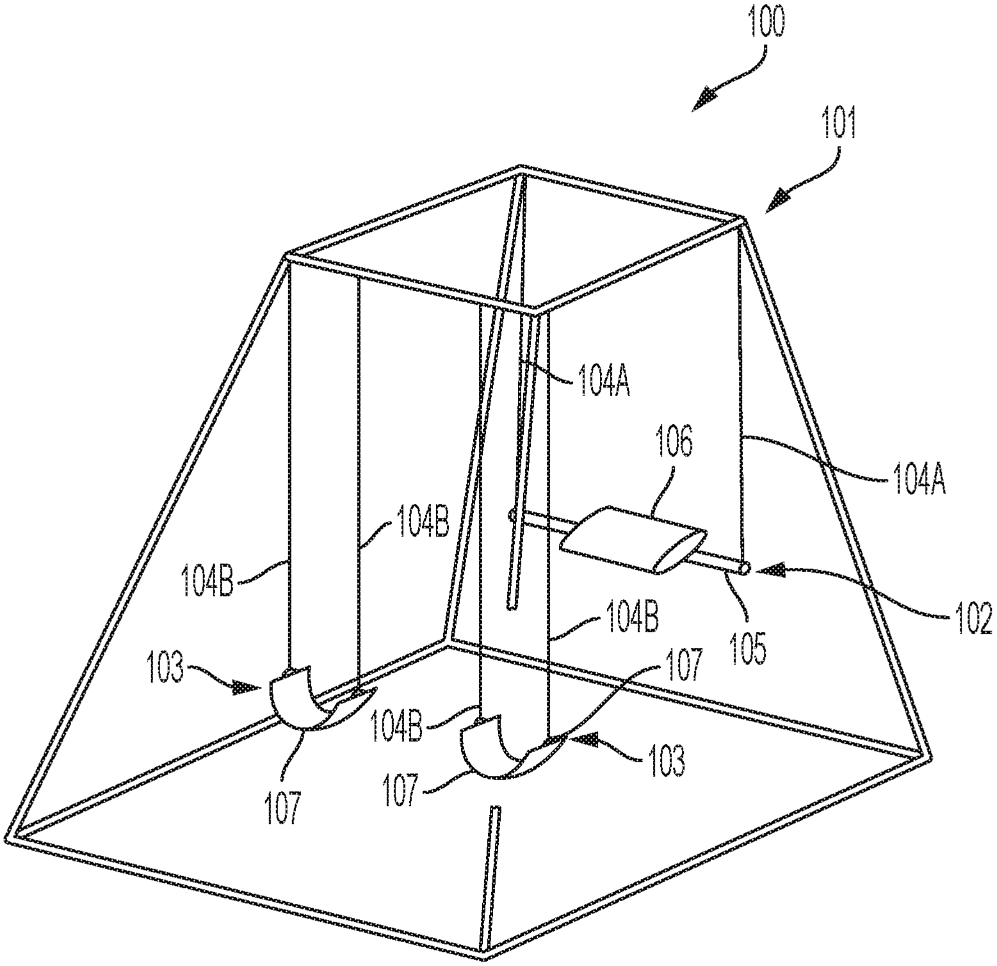
FIG. 1 shows childbirth support apparatus in accordance with an embodiment.

As is evident from FIG. 1, the harnesses 102, 103 are not restrictively interconnected to each other so that each harness 102, 103 can swing independently with respect to the frame 101 and each other.

Preferably, each harness 102, 103 is independently supported from the frame 101 by respective tethers 104. Each tether 104 may be independently connected to the frame 101. Furthermore, each tether 104 may be releasably attachable to the frame 101.

The chest swing harness 102 may comprise a cross support 105 hung from the frame 101 by a pair of tethers 104A either side thereof. In the embodiment shown, the cross support comprises a rigid bar. A cushion 106, padding or the like may be placed across the bar 105 in use for comfort. As is shown in FIG. 3, the tethers 104A may go under each arm.

Each thigh swing harness 103 may comprise a web 107 hung from the frame 101 by a pair of respective tethers 104B either side thereof. Preferably, the tethers 104B are spaced apart, such as by being separately attached to the frame 101 from separate attachment points, so that the webs 107 remain open in a neutral position.

Each thigh swing harness 103 may be configured in an open position wherein one side of the web 107 is disconnected from a respective tether 104B and a closed position wherein both sides of the web 107 are connected to respective tethers 104B. As such, each thigh swing harness 103 can be opened for stepping into or out of the apparatus 101.

Each web 107 may comprise a D-ring 107 or the like and wherein the respective tether 104B comprises a respective gate hook 108.

The apparatus 100 may be configured to hang the thigh swing harnesses 103 approximately 450 mm-500 mm above ground. The thigh swing harness tethers 104B may be length adjustable to control the height of the thigh swing harnesses 103.

The apparatus 100 may be further configured to hang the chest swing harness 102 approximately 900 mm-1000 mm from the ground. Similarly, the chest swing harness 102 tethers 104A may be length adjustable to control the height of the chest swing harness 102.

Furthermore, the apparatus 100 may be configured to space the thigh swing harnesses 103 approximately 500 mm apart in a neutral position. In embodiments, when the thigh swing harnesses 103 hang straight down from the frame 101, the thigh swing harnesses 103 may be approximately 500 mm apart.

The apparatus 100 may be configured to space the chest swing harness 102 approximately 500 mm in front of the thigh swing harnesses 103. In embodiments, when the chest swing harness 102 and the thigh swing harnesses 103 are hanging straight down from the frame 101, the chest swing harness 102 may be approximately 500 mm in front of the thigh swing harnesses.

The frame 101 may be modularly disassemble so as to be able to be erected in a birthing suite, home or the like for when giving birth. In this regard, the frame 101 may comprise poles which interconnect at corners thereof. The holes may be metallic and powder coated.

The frame 101 may be substantially frusto-pyramoidal in shape as is shown in FIG. 1 to maximise height and spread under a conventional high ceiling. According to this arrangement, the frame 101 may define an upper rectangle and a larger lower rectangle and angled braces interconnecting corners thereof. The frame 101 may be between 1.5 m and 1.7 m high.

In embodiments, the apparatus 100 comprises a catch net which may be interconnected three-ways between the three harnesses 103 and 106 to be suspended from the three harnesses 103 and 106 to help catch a delivered baby. The net may comprise releasable couplings at each of three corners thereof each of which may be interconnected from the respective harnesses 103, 106, such as by the D-rings 108 thereof.

In embodiments, the frame 101 may support storage compartments, such as fabric storage compartments which hang down from the frame 101 within which accessories and the like may be held. The componentry of the apparatus 100 may be configured to be taken apart, including for cleaning. Each tether 104 may be releasably attachable from the frame 101, such as by way of attachable gate hooks.

Utilisation of the apparatus 100 for giving birth would comprise stepping into the frame 101 with the thigh swing harnesses 103 in the open configuration. Each thigh swing harness 103 may be closed behind each thigh by attaching the gate hook 108 to the respective D-ring 107.

The mother can then sit down into a squatting position wherein the thigh swing harnesses 103 support the mother from under the thighs as is shown in FIG. 2.

The pillow 106 may be placed across the bar cross member 105 of the chest swing harness 102 and the mother can lean forward into the leaning-forward squatting position illustrated in FIG. 2 and be supported also by the chest swing harness 102.

The squatting position takes pressure from the coccyx, thereby opening the birth canal. Leaning forward with the legs splayed apart as is shown in FIG. 3 further opens the pelvis and widens the birth canal.

As the harnesses 102, 103 are not restrictively interconnected to each other, the harnesses 102, 103 can swing freely and independently from each other, allowing the mother to change body position to find the most comfortable position without restraint.

The foregoing description, for purposes of explanation, used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive or to limit the invention to the precise forms disclosed as obviously many modifications and variations are possible in view of the above teachings. The embodiments were chosen and described in order to best explain the principles of the invention and its practical applications, thereby enabling others skilled in the art to best utilize the invention and various embodiments with various modifications as are suited to the particular use contemplated. It is intended that the following claims and their equivalents define the scope of the invention.

The invention claimed is:

1. Childbirth support apparatus comprising:

a frame suspending a chest swing harness and a pair of thigh swing harnesses, wherein:

the frame suspends the thigh swing harnesses adjacently and the chest swing harness in front of the thigh swing harnesses and the thigh swing harnesses lower than the chest swing harness so that the apparatus is configured to support a mother in a leaning-forward squatting position wherein the thigh swing harnesses is configured to hold the mother under thighs and wherein the chest swing harness is configured to hold the mother across the chest; and the harnesses are not restrictively interconnected to each other so that each harness can swing independently with respect to the frame.

2. The apparatus as claimed in claim 1, wherein each thigh swing harness comprises a web hung from the frame by a pair of respective tethers either side thereof.

3. The apparatus as claimed in claim 2, wherein each thigh harness is configured in an open position wherein one side of the web is disconnected from a respective tether and a closed position wherein both sides of the web are connected to respective tethers.

4. The apparatus as claimed in claim 3, wherein the tethers are separately attached to the frame from separate attachment points.

5. The apparatus as claimed in claim 1, wherein the apparatus is configured to hang the thigh swing harnesses approximately 450-500 mm from a ground surface.

6. The apparatus as claimed in claim 5, wherein tethers supporting the thigh swing harnesses are length adjustable.

7. The apparatus as claimed in claim 6, wherein tethers supporting the chest swing harness are length adjustable.

8. The apparatus as claimed in claim 1, wherein the chest swing harness comprises a cross support hung from the frame by a pair of tethers either side thereof.

9. The apparatus as claimed in claim 8, wherein the cross support comprises a rigid bar.

10. The apparatus as claimed in claim 1, wherein the frame is frusto-pyramoidal.

11. The apparatus as claimed in claim 10, wherein the frame defines an upper rectangle and a larger lower rectangle and angled braces interconnecting corners thereof.

12. The apparatus as claimed in claim 1, further comprising a catch net held between the chest swing harness and the pair of thigh swing harnesses.

13. The apparatus as claimed in claim 12, wherein the catch net is suspended from the chest swing harness and the pair of thigh swing harnesses.

14. A method of childbirth using the apparatus as claimed in claim 1, the method comprising sitting in a leaning-forward squatting position with thighs supported by the thigh swing harnesses and chest supported by the chest swing harness wherein the harnesses are not restrictively interconnected to each other so that each harness can swing independently with respect to the frame.

15. A method as claimed in claim 14, further using the apparatus as claimed in claim 3, further comprising stepping into the frame with the thigh swing harnesses in the open configuration, closing each thigh swing harness behind each thigh, sitting down into a squatting position wherein the thigh swing harnesses support under the thighs and leaning forward into a leaning-forward squatting position wherein the chest is supported by the chest swing harness.

16. The apparatus as claimed in claim 1, wherein the apparatus is configured to hang the chest swing harness approximately 900 mm-1000 mm from a ground surface.

17. The apparatus as claimed in claim 1, wherein the frame holds the thigh swing harnesses are approximately 500 mm apart.

18. The apparatus as claimed in claim 1, wherein the frame holds the chest swing harness is approximately 500 mm in front the thigh swing harnesses.

19. The apparatus as claimed in claim 1, wherein the frame is modularly assembled from poles which interconnect at corners thereof.

20. The apparatus as claimed in claim 1, wherein the frame is between 1.5 and 1.7 m high.

* * * * *